United States Patent [19]

Weitzel

[11] Patent Number: 4,686,568

[45] Date of Patent: Aug. 11, 1987

[54] METHOD OF INCREASING THE DYNAMIC RANGE AND REDUCING QUANTIZATION NOISE OF VIDEO SIGNALS

[75] Inventor: Otto Weitzel, Stadtallendorf, Fed. Rep. of Germany

[73] Assignee: Robert Bosch GmbH, Stuttgart, Fed. Rep. of Germany

[21] Appl. No.: 692,307

[22] Filed: Jan. 17, 1985

[30] Foreign Application Priority Data

Jan. 27, 1984 [DE] Fed. Rep. of Germany ....... 3402796

[51] Int. Cl.$^4$ ............................................. H04N 5/06
[52] U.S. Cl. .................................... 358/150; 358/160
[58] Field of Search .................... 358/155, 172, 13, 34, 358/171, 37, 36, 133, 319, 160, 141, 21 R, 12, 166, 173, 120, 150; 380/15

[56] References Cited

U.S. PATENT DOCUMENTS

| | | | |
|---|---|---|---|
| 3,504,115 | 3/1970 | Suzuki et al. | 358/133 |
| 4,454,544 | 6/1984 | Abbott | 358/150 |
| 4,517,586 | 5/1985 | Balaban et al. | 358/13 |
| 4,535,357 | 8/1985 | Penny | 358/150 |
| 4,574,302 | 3/1986 | Mackereth | 358/150 |

FOREIGN PATENT DOCUMENTS 0188979 11/1983 Japan ................................. 358/160
1274328 5/1972 United Kingdom .

Primary Examiner—Tommy P. Chin
Assistant Examiner—David E. Harvey
Attorney, Agent, or Firm—Frishauf, Holtz, Goodman & Woodward

[57] ABSTRACT

The full range of available steps provided by n-bit samples is utilized to digitalize television line picture signals of a composite video signal. The synchronizing signals in the blanking intervals which separate the picture signals of successive television lines are confined to the same range of multibit word values as the television line picture signals. This reduces quantization noise in the picture signals. The necessary processing may precede digitalization and be performed by superposing a d.c. voltage in the blanking intervals of a standard composite television signal so as to shift the voltage range of the synchronizing signals and bring them within the voltage range of the picture signals, or it may be performed after digitalization by interposing a digital synchronizing signal, obtained from a store, having a same multibit word value range as the digitalized picture signals, into the blanking intervals.

2 Claims, 6 Drawing Figures

METHOD OF INCREASING THE DYNAMIC RANGE AND REDUCING QUANTIZATION NOISE OF VIDEO SIGNALS

In the digital processing of color television signals which can start either from a conventional composite television signal or as a time division multiplex signal (TDMS), it is desirable to increase the dynamic range of the digitalized video signal in order to obtain less quantization noise. A video signal digitalized into 8-bit samples provides a theoretical maximum of 256 steps for the video signal, but commonly the black value is set at the digital value of 60, and the 100% white level is set at the digital level of 200, so that the dynamic range of the video information spans only 140 step values.

In order to increase this dynamic range, it would be conceivable to reduce the amplitude of the synchronizing pulse, which occupies the first 60 possible steps by about one-third, so that the black value could be set, for example, at the digital value of 40. This would produce a gain of about 20 step values for the dynamic range of the video information which would then comprise 160 step values. A disadvantage, on the other hand, is that the standard synchronizing pulse would be lost, leading to undesirable results.

SUMMARY OF THE INVENTION

It is an object of the present invention to extend the dynamic range of a digitalized picture signal and its blanking over the full number of steps of the digitalized video signal produced with the number n of bits used per sample.

Briefly, the voltage range of the synchronizing signal is shifted within the blanking interval of the picture signal so as to occupy part of the video signal range during that interval, when, of course, the picture signal itself is not present. This has the advantage that the broadened dynamic range obtained, compared with the usual digitalization of a composite video signal or a time division multiplex television signal makes possible the reduction of the quantization noise by about 3 dB. It is particularly advantageous, when the color television signal is available in already digitalized form, in which the synchronizing signal is already stored as a table value, to form a fixed unit of the signals together constituting the synchronizing signal, namely the synchronizing pulse and the burst.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1A:
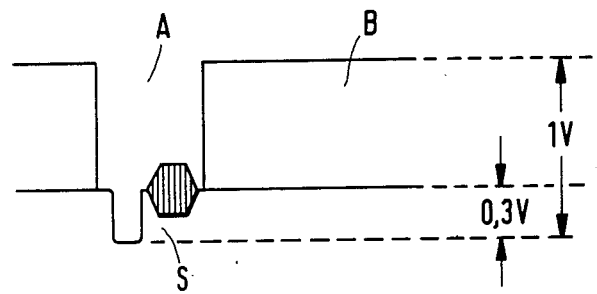
FIGS. 1a, 1b and 1c are graphs of voltage against time for explaining the processing of video signals according to the invention.

FIG. 1a is the diagram of a color television signal that can be provided either as a standard composite video signal (for example NTSC) or as a time division multiplex signal. This signal, as is known, consists of the picture signal information B, the blanking interval A and the synchronizing signal S which comprises the synchronizing pulse and the color synchronizing signal or time reference (burst). If the illustrated signal is digitalized into 8-bit samples, thus into 256 step values, then for a total voltage range for the signal as a whole of 1 V and of 0.3 V for the synchronizing signal, there would be a voltage value of 3.906 mV per step total signal range (one 256th of a volt).

Figure 1B:
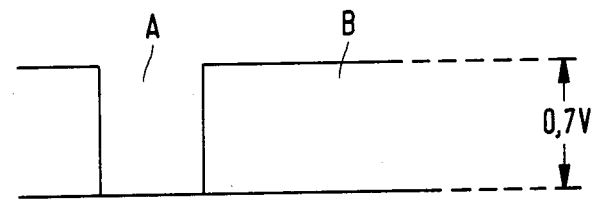

If now, according to FIG. 1b, only the picture signal having its blanking interval A is digitalized on an 8-bit basis, in the case of a voltage value of 0.7 for this BA signal, there would be a voltage value of 2.734 mV per step (0.7/256). In order to obtain the same quantization range (0 to 1 V) that is used for a standard NTSC signal, it would be necessary for direct sampling to use a digital-to-analog converter 1-bit greater in size, which is to say providing 9-bit samples. Consequently, in the practice of the present invention processing is done by digitalizing on an 8-bit basis the voltage range of 0.7 V, with the synchronizing signal S shifted into the voltage range of the picture signal B. The 2.734 mV per step operation thereby reached provides an improvement of about 3 dB with regard to quantization noise:

$$20 \log \left( \frac{1 \text{ V}}{2^n} \cdot \frac{2^n}{0.7 \text{ V}} \right) \approx 3.1 \text{ dB}$$

Figure 1C:
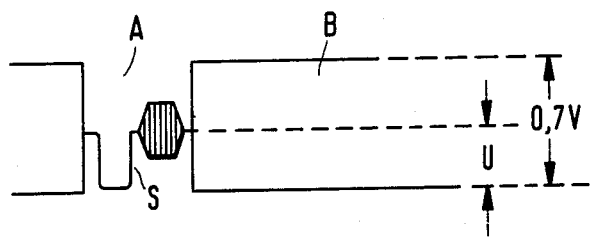
Figure 2:
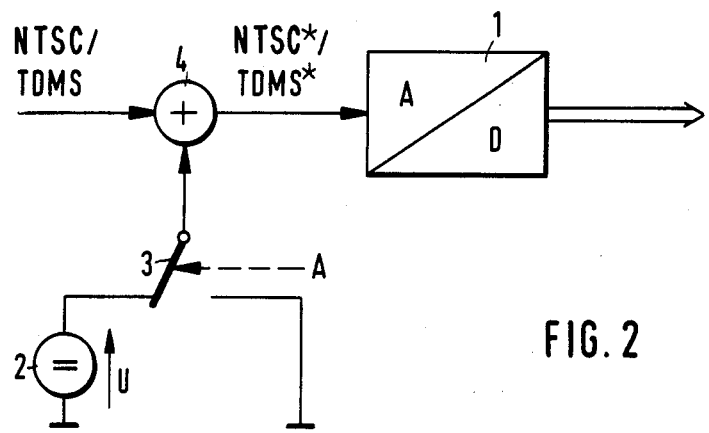
FIG. 2 is a block circuit diagram for carrying out the method of the invention for analog video signals.

The shift of the synchronizing signal S into the voltage range of the picture signal B takes place in the case of an analog NTSC or time division multiplex signal, in accordance with FIG. 2, ahead of the analog-to-digital conversion in the converter 1 by utilizing a d.c. voltage U generated by a d.c. voltage source 2 and a switch 3 controlled by the blanking signal A, so that the d.c. voltage U is applied to an addition stage 4 during the blanking interval. The NTSC or time division multiplex signal is applied to the other input of the addition stage 4, so that at the output of the addition stage there is available a signal of the kind shown in FIG. 1c which may be referred to as NTSC* or a TDMS* signal.

Figure 3:
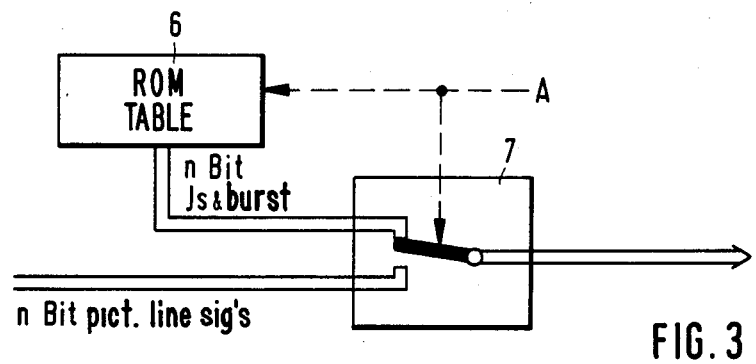
FIG. 3 is a block circuit diagram for carrying out the method of the invention for digital video signals and, FIG. 4 is a block diagram of a circuit for recovery of the original signal that was digitally processed.

When there is present an already digitalized NTSC signal or TDM signal, a synchronizing signal likewise already digitalized can be supplied during the blanking interval in a circuit of the kind shown in FIG. 3. For this purpose, a programmable store 6 is provided which contains the digital synchronizing signal with its synchronizing pulse and burst as an entry in a data table. This stored signal group is inserted into the digital color signal during the blanking interval with the help of the blanking signal which controls the store 6 and a switch 7. At the output of the switch 7, there is available a video signal digitalized on an n-bit (for example 8-bit) basis, which likewise has the same dynamic range as the sample BA signal.

Figure 4:
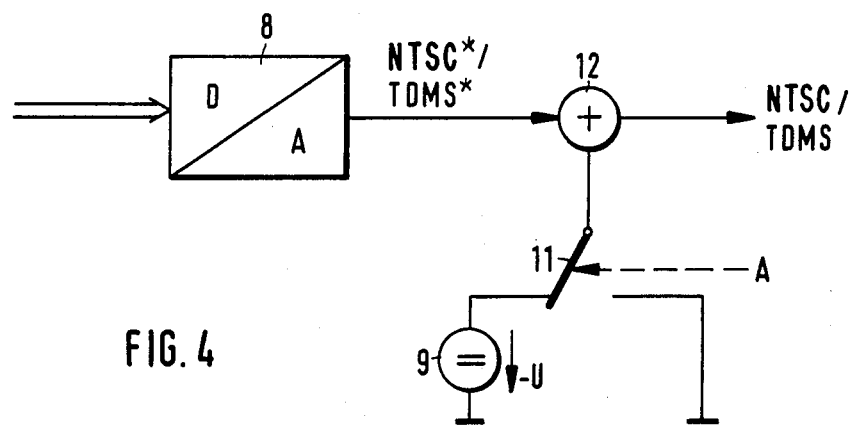

For recovering the standard NTSC or TDM signal, the digital video signal, after digital processing, transmission and/or recording, is first put into a digital-to-analog converter 8 in the circuit of FIG. 4, is thereby converted into the analog NTSC* or TDMS* signal and is then subjected to a d.c. voltage −U during the blanking interval. This d.c. voltage −U is taken from a d.c. voltage source 9 and supplied to an input of the addition stage 12 over a switch 11 controlled by the blanking interval signal. The already mentioned video signal is present at the other input of the addition stage 12. Accordingly an NTSC or TDMS signal according to Fig. 1a is made available at the output of the addition stage 12.

Although the invention has been described with reference to particular illustrative examples, it will be understood that variations and modifications are possible within the inventive concept.

I claim:

1. Method of minimizing video quantization noise in digitalized composite televison signals in which synchronizing signals appear interposed in blanking intervals between television-line picture signals said television line picture signals occupying a predetermined range of values available for them, and said synchronizing signals including discrete synchronization pulses and wave bursts of a synchronization frequency, including the steps of:

providing from a tabular memory containing stored data representing a digital discrete synchronization pulse and a digital synchronizing frequency wave burst, in response to a television blanking signal representing said blanking intervals, said stored data representing said digital discrete pulse and said digital wave burst occupying the same range of values as said television-line picture signals and said stored data being provided within each of said blanking intervals from said memory in synchronized sequence corresponding to the sequence of said pulses and bursts of said synchronizing signals, and substituting, by a switching operation during said blanking intervals, said stored data representing said digital synchronization pulse and said digital wave burst provided from said memory for the synchronization pulses and the waves bursts of said digitalized composite television signals, whereby digitalized modified composite signals are produced comprising said television-line signals and said stored data provided from said memory occupying said same range of values.

2. Method according to claim 1, including also, for recovery of analog television composite signals, a later step of converting the digitalized modified composite television signals into analog composite television signals and then superposing a d.c. voltage ($-U$) thereon during the blanking intervals of said analog composite television signals such as to put the voltage range available for the discrete pulses of synchronizing signals included in said analog signals outside the voltage range available for television-line picture signals included in said analog signals.

* * * * *